Nov. 18, 1969    Z. CSERI    3,478,895
COUPLING DEVICE
Filed Aug. 28, 1968    4 Sheets-Sheet 1
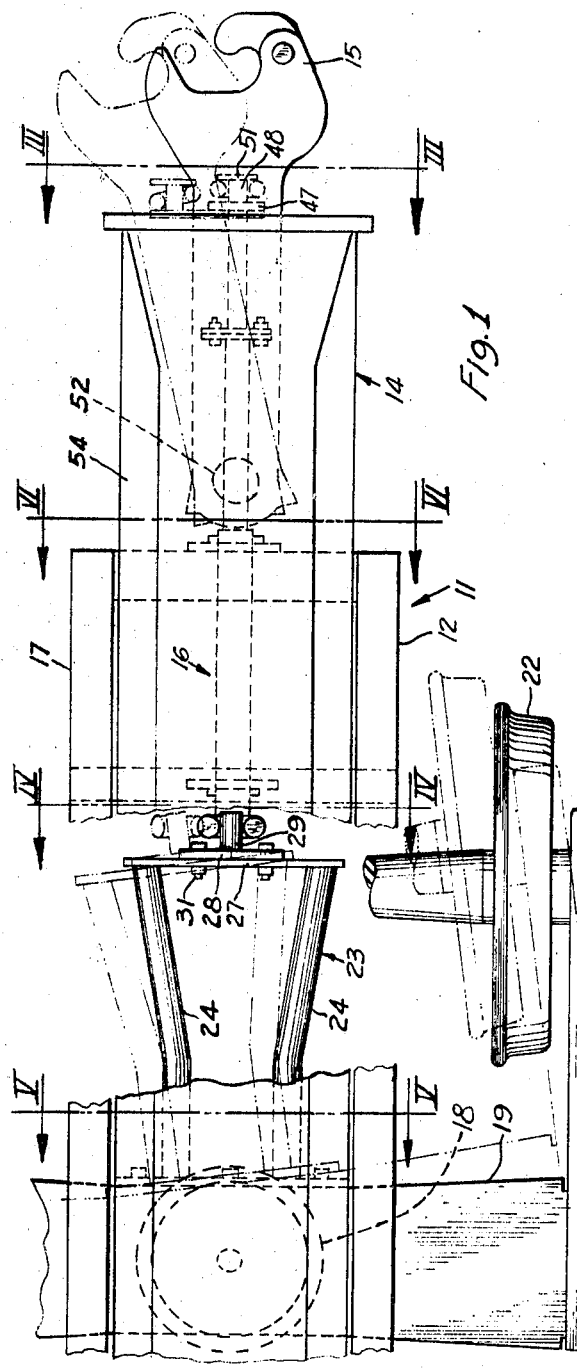
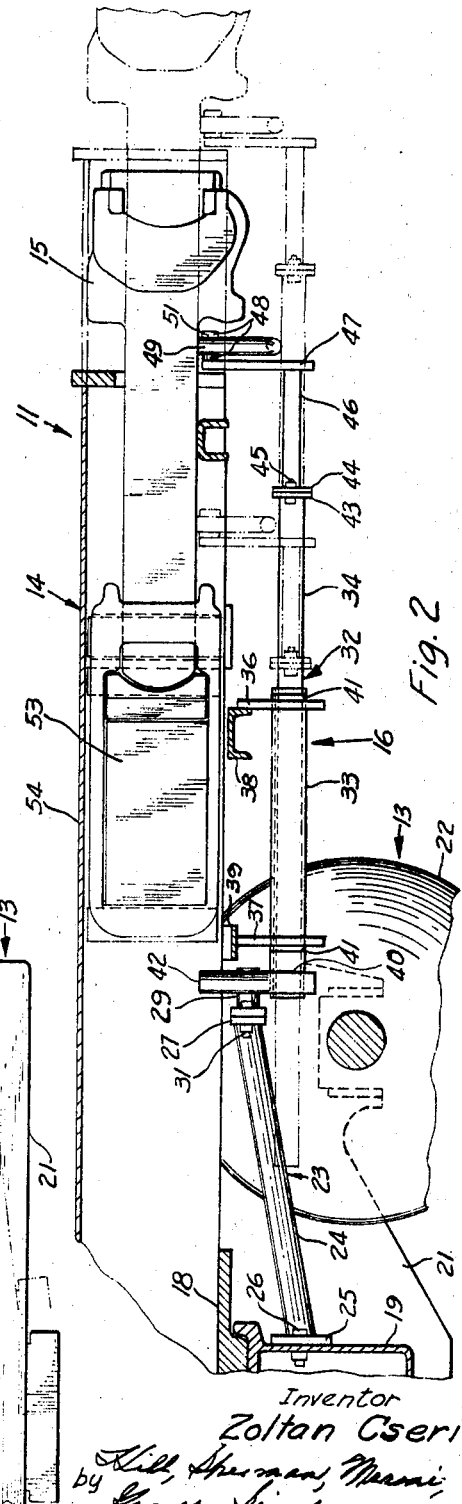
Inventor
Zoltan Cseri Nov. 18, 1969  Z. CSERI  3,478,895
COUPLING DEVICE
Filed Aug. 28, 1968  4 Sheets-Sheet 3

INVENTOR
ZOLTAN CSERI
ATTORNEYS

INVENTOR
ZOLTAN CSERI

United States Patent Office 3,478,895
Patented Nov. 18, 1969

3,478,895
COUPLING DEVICE
Zoltan Cseri, 419 Sheridan Road,
Winnetka, Ill. 60093
Continuation-in-part of application Ser. No. 631,975,
Apr. 19, 1967. This application Aug. 28, 1968, Ser.
No. 767,885
Int. Cl. B61g 7/06, 7/12, 9/20
U.S. Cl. 213—15                                    15 Claims

ABSTRACT OF THE DISCLOSURE

A steerable coupling device for a railroad car having a bar lever means which transmits the turning movement of the car truck to the pivotally connected coupler so that the coupler and the truck move in the same direction. In one embodiment, the bar lever means includes a clutch which allows the coupler to be disconnected from the car truck to allow independent pivotal movement.

Cross-reference to related cases

The present application is a contination-in-part application of my co-pending application U.S. Ser. No. 631,975, entitled "Coupling Device" filed Apr. 19, 1967, now abandoned.

Background of the invention

*Field of the invention.*—In a coupling device for railroad cars, this invention pertains to the structure of a steerable coupling device in which the movement of the truck of the car is transmitted to the coupler to move it in the same direction.

*Description of the prior art.*—As the railroads began using longer cars, many problems began to arise because of the increased distance between the end of the car and the truck that carries the car. Because of the added length the car may follow average curves in the railroad track. center of the car from the end of the car in order that the car ay follow average curves in the railroad track. This placement of the truck necessitated a longer shank coupler than was used in the prior car constructions. In the use of the longer cars, the railroads also found it desirable to utilize a shock absorbing system called a cushion underframe in these cars to prevent unnecessary damage to the contents of the car due to impact which occurs primarily during coupling of the cars. The coupler is attached to a sliding sill which is connected to the car through a shock absorbing device at the center of the car so that impacts occurring during coupling of two cars will not harm the contents. In order for the shock absorbing system to be completely effective, the couplers of the two cars must be reasonably aligned when the two cars are being coupled together. If the couplers are misaligned, the full impact will be transmitted directly from the first car to the second car. This impact causes damage not only to the contents of both cars but to the structure of both cars. It should be noted that cars equipped with cushioned underframe will not be damaged if the couplers are misaligned during coupling; but, the coupler and air hoses are often damaged and require extensive repairs to put the car in satisfactory operating condition. Misalignment of the couplers occurs frequently when the cars are being uncoupled on a curved section of track and recoupled on a straight section of the track or vice versa. In the cars used prior to the advent of the longer freight cars, the switchman would manually position both couplers so that they would register when the two cars came together. With the use of the longer shanked coupler necessitated by the use of the newer and longer railroad cars, the positioning of the longer and therefore heavier coupler has been extremely difficult.

In the past, several devices have been tried in an effort to alleviate the problem of misaligned couplers during the coupling of series of railroad cars. One such device comprises means positioned below the coupler which is spring actuated and which causes the coupling to remain in the position where it is left following uncoupling. When the coupler is off center, a release lever is actuated and the spring forces the coupler to the center position. If the coupler is in the centered position and it is desired that it should be in an off-center position, the release lever is actuated and the coupler is forced to the desired position against the force of the spring and then the means to hold the coupler in place is engaged. This device allows the switchman to be clear of the coupler during the coupling operation, but requires time consuming and heavy labor by the switchman to move the coupler to the desired position.

A second means to overcome the problem consists of a series of chains and springs attached to the truck of the car which moves the coupler in the direction in which the truck is turned. Therefore, if a car is moved onto a curved section of track, the coupler will be positioned with respect to this curve by the movement of the truck. If the car is uncoupled on a curve section of track and then moved onto a straight section of the track, the truck will move the coupler so that it will be aligned in the proper position while on the straight section of track for the coupling operation. This type of coupler device comprises a rather complicated set of chains, springs and support members. The position of this device is well below the coupler and is subjected to being fouled by any material laying on the track between the rails. Furthermore, this device cannot be modified to be used on a railroad car equipped with the cushion underframe because the device will not allow the necessary movement of the coupler. Another disadvantage with this steering device is the possibility of injury to the switchman from one of the large number of exposed parts.

Summary of the invention

The present invention solves the problem of misaligned couplers on railroad cars, even those with a cushioned underframe, by using a simple coupler positioning linkage which transmits the movement of the truck to the coupler. This linkage comprises a first transfer means attached to the bolster of the truck which coacts with a lever arm of a shaft which is rotatably attached to the undercarriage of the car, the other end of the shaft being attached by means of a lever arm and a second transfer means to the coupler so that the movement of the truck is transmitted by the shaft to the coupler to steer or align the coupler. In one embodiment of the invention clutch means is provided on the shaft to enable the coupler to be pivoted independently of the position of the truck.

Accordingly it is an object of this invention to provide a new and novel coupling device which is aligned and steered by the truck of the railroad car.

Another object of this invention is to provide a coupling device whose steering mechanism may move with the coupler as the coupler is moved with the sliding sill attached to the shock absorbing system in relation to the car underframe.

A still further object of this invention is to provide a coupling device which has a lever means attached to the undercarriage of the car, which is actuated by the movement of the truck and transfers this movement to the coupler which is pivotally attached to the sliding sill of the car.

Yet another object of the present invention is to provide a coupling device which is aligned and steered by the truck of the railroad car and which includes a clutch means which allows the selective disengagement of the coupler from the aligning and steering mechanism actuated by the truck of the car.

Other objects and advantages of the invention will become apparent from the disclosure in the following specification and the appended drawings.

Brief description of the drawings

FIGURE 1 illustrates a top plan view with portions broken away and portions omitted or clarity of the truck and coupling device of a railroad car and illustrates the relationship of the movement of truck and coupling device;

FIGURE 2 is a side view of the truck and coupling device of the railroad car with some of the parts in section and with some portions omitted for purposes of illustration;

Description of the preferred embodiments

Figure 3:
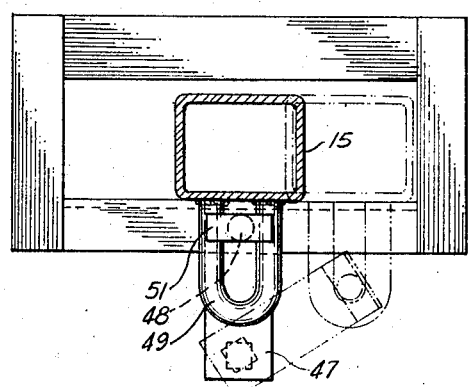
FIGURE 3 is a partial section taken on line III—III of FIGURE 1.

The principles of this invention are incorporated in an undercarriage of a railroad car generally indicated by the numeral 11. The undercarriage 11 is made up of an underframe generally indicated by the numeral 12, a truck generally indicated by the numeral 13, a shock absorbing mechanism or cushioned undercarriage generally indicated by the numeral 14, a pivotably connected coupler generally indicated by the numeral 15 and a coupler steering mechanism or device generally indicated by the numeral 16.

A steerable coupler, as shown in FIGURE 1, generally operates in the following manner. As the truck 13 moves to that position shown in the phantom view, it causes the steering mechanism 16 to rotate which in turn forces the coupler 15 to move about a pivot point in the same direction as shown in phantom, as the truck 13 had moved.

The undercarriage 11, as shown in FIGURES 1 and 2, comprises a stationary or fixed sill 17 and a center plate 18. The rest of the underframe has been broken away in order to illustrate the steering mechanism 16 and its relationship with the truck 13 and the coupler 15.

The truck 13 consists of a bolster 19 which is connected to a pair of side members 21 (only one shown) which support the wheel 22. Rigidly attached to the bolster 19 is a first transfer means comprising a structural means 23 which coacts with the steering means 16. The structural means 23 consists of two tubular members 24, 24 which are attached to the bolster 19 by means of a plate 25 welded to the tubes 24, 24. The plate 25 is attached to the bolster 19 by any suitable means 26, which is illustrated to be bolts. The tubes 24, 24 are secured together at an end opposite to the bolster 19 by a flange 27 which may be welded thereto. The flange 27 carries a second flange 28 which supports a pin member 29. The flanges 27 and 28 are secured together by fastening means such as bolts 31. The holes for the bolts 31 in flanges 27 and 28 may be made as oval slots to allow for adjustment of the pin 29 in a vertical direction.

Figure 4:
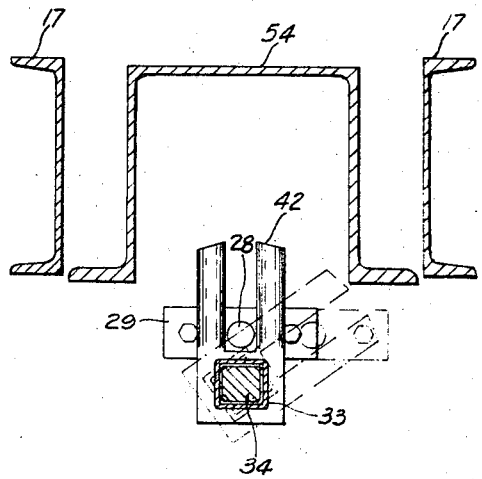
FIGURE 4 is a partial section taken on the line IV—IV of FIGURE 1.
Figure 5:
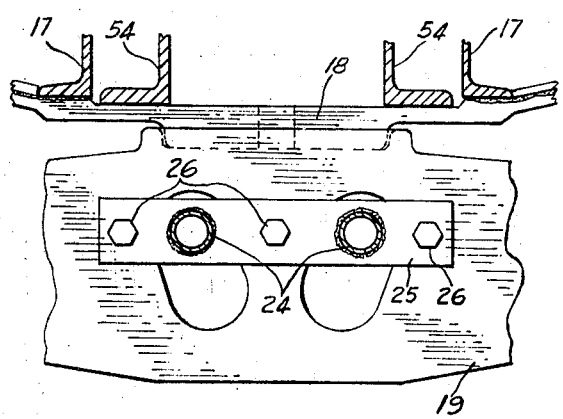
FIGURE 5 is a partial section taken on the line V—V of FIGURE 1.

The structural means 23 which turns with the truck 13 actuates a second means 32 of the steering means 16 to transmit the turning of the truck to the coupler 15. The second means 32 is made up of a first shaft means or hollow tube 33 and a second shaft means 34 which preferably slides telescopically in the hollow tube 33. The tube 33 which is preferably a square tube is rotatably supported in openings such as 35 in the plates 36 and 37. The plate 36 is secured to a sill end carrier 38 which is attached to the end of the stationary sill 17. The plate 37 is attached to a bottom portion 39 of the stationary sill 17. To prevent movement of the tube 33 along its axis, a stop or retainer means such as illustrated as flanges 41 are provided on the tube 33. Attached to an end 40 of the tube 33 adjacent to the bolster 19 is a sliding pin guide lever 42 which, as illustrated in FIGURE 4, comprises a U-shaped member. The movement of the pin 29 will cause the sliding pin guide 42 to rotate about the axis of the tube 33 and thus cause the tube 33 to rotate about its axis.

The second shaft means 34 which fits inside of the tube 33 telescopically has a flange 43 which is secured to the flange 44 by a fastening means such as bolts 45 to support a torsion bar extension 46. On an end of the extension 46 opposite the flange 44 is a lever 47 which carries a pin 48. The coupler 15 has a pin guide means 49 which extends downward and engages the pin 48. The pin 48 and pin guide 49 coact to form a second transfer means. A guard or stop 51 is attached to the pin 48 and prevents the pin from slipping out of the guide 49 when the coupler is being moved with respect to the underframe 12. This guard 51 also causes members 34 and extension 46 to move with the coupling during axial movement of the coupler 15 with the cushioned underframe 14. As shown in FIGURE 2, the member 34, when moved to the farthest position to the left will extend between the tubular members 24, 24, which are spaced to provide clearance for member 34 besides providing a rigid structure. The member 34 and extension 46 will rotate with the member 33. When these members 34 and 46 rotate, the lever 47 acting through the pin 48 in the slide 49 will move the coupler 15.

The coupler 15 is pivotally mounted at 52 to a standard compressible draft gear 53. The draft gear 53 is secured in a sliding sill 54 which is a part of the shock absorbing mechanism 14. The coupler 15 and the sliding sill 54 may move longitudinally with respect to the car frame. The movement is shown in phantom in FIGURE 2 and is part of the standard means of absorbing the shock when two cars equipped with cushioned undercarriages are being coupled together.

The torsion bar extension 46 will twist during a coupling operation to compensate for any minor misalignment which may be present. The twisting of the torsion bar 46 will accomplish two functions of facilitating coupling when minor misalignment is present and preventing damage to the remaining parts of the steering assembly 16 which could occur because of the minor misalignment.

From the drawings, it is clear that the pivotally mounted coupler 15 can be moved in the same direction as the movement of the truck 13 by the steering means 16.

Figure 6:
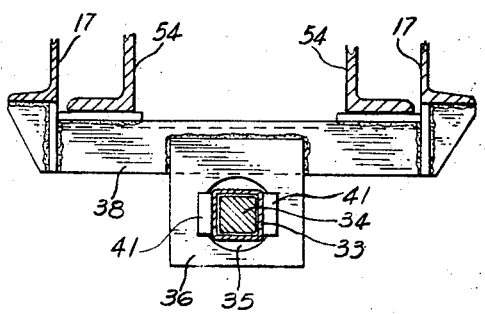
FIGURE 6 is a partial section taken on the line VI—VI of FIGURE 1.
Figure 7:
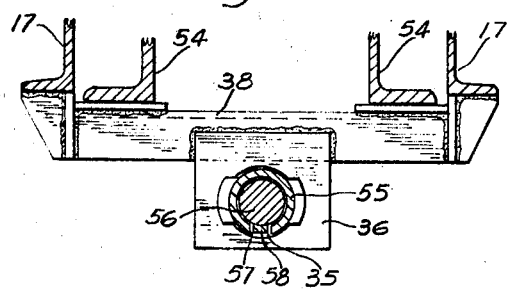
FIGURE 7 is a modification showing a different embodiment of that illustrated in FIGURE 6.
Figure 8:
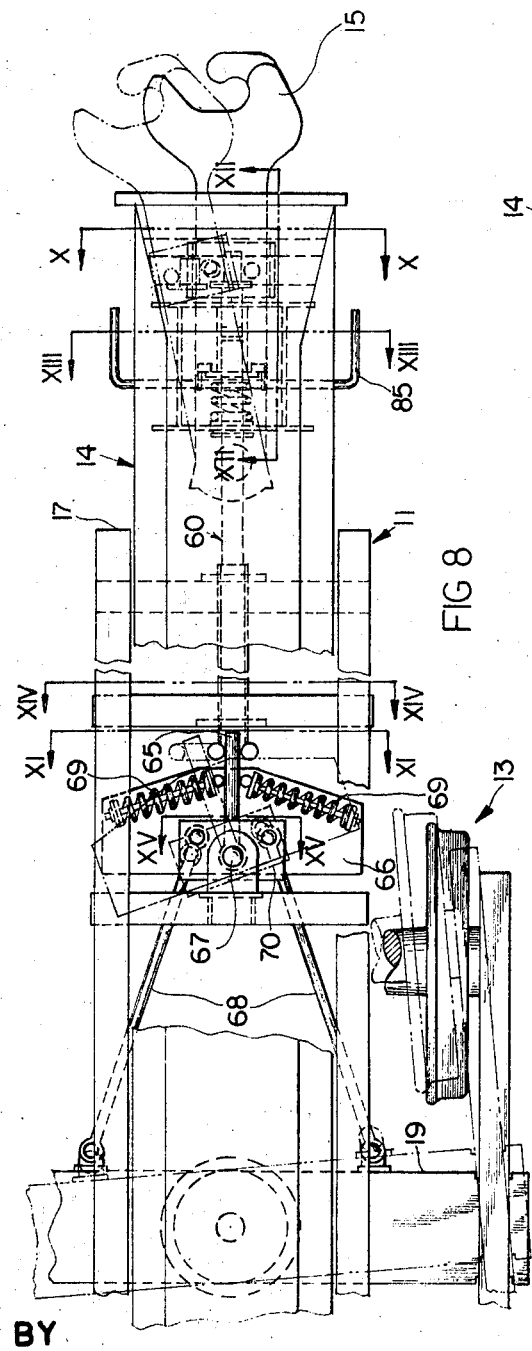
FIGURE 8 illustrates a top plan view with portions broken away and portions omitted for clarity of the truck and frame similar to FIGURE 1 with a modified embodiment of the coupling device of a railroad car.

Another embodiment of the steering mechanism 16 illustrated in FIGURE 7 uses, instead of the square tubes 33 and the square member 34, a round tube 55 and a rod-like member 56. The tube 55 has a slot 57 extending its full length. The member 56 has a projection 58 which slides in the slot 57 to impart the rotation of the tube 55 to the member 56. The tube 55 and member 56 of the embodiment illustrated in FIGURE 7 functions in the same way as the tube 33 and member 34 of the embodiment of FIGURES 1, 2, 6.

As may be seen from FIGURE 2, the steering linkage 16 is attached adjacent to the frame and as shown from FIGURE 1, it is attached on the centerline of the frame of the railroad car. Therefore, the linkage is not in a position such as those linkages in the prior art to be tangled in articles laying between the rails of the track. Nor is it in a position where it hampers or endangers the switchman while he is performing his duties during coupling and uncoupling of the cars.

FIGURES 8 through 15 show a second embodiment of the coupler steering mechanism or device generally indicated at 60 which is attached to the undercarriage 11 of the railroad car. Portions of the car and of the steering mechanism which are the same as the previously described embodiment are identified by like numerals. The coupling steering mechanism or device 60 is made up of the coupler 15, the first shaft means 33, the second shaft means 61, the first transfer means 62, the second transfer means 63, and the clutch means 64. The first shaft means 33 which is a hollow square tube is mounted for rotation about its axis on the stationary or fixed sill or frame 17 with the axis of the shaft means 33 being parallel to the center line of the frame or undercarriage 11. Attached to the end of the first shaft means adjacent to the bolster 19 is a first lever arm 42 (see FIGURE 11) which contains a sliding pin guide means which cooperates with the first transfer means 62 so that the rotational movement of the bolster 19 of the truck 13 rotates the first shaft means 33 about its axis.

The first transfer means 62 (FIGURES 9 and 15) is made up of a pin 65 and a plate 66 which are both pivoted to a bracket attached to the stationary frame 17 by a pin 67. The plate 66 which has a U-shape cross-section and an upper plate 70 is interconnected to the bolster 19 by connecting rods 68, 68 (FIGURE 8) which are pivotally attached to the plate at one end and pivotally attached to the bolster at the other end. The plate 66 supports a pair of spring means 69, 69 which transmit the pivotal movement of the plate 66 to the pivotal pin 65. The spring 69 provides a yieldable connection between the pin 65 and the plate 66, so that if a force is applied to either of the members, the springs will allow the plate 66 to pivot relative to the pin 65 and prevent damage to the steering mechanism 60 and to allow for slight misalignment during a coupling operation.

Telescopically received in the first shaft means 33 (FIGURE 9) which is a rectangular shaped hollow tube is a second shaft means 61 which also has a rectangular cross-section to transmit the rotation between the shaft means and which is rotatably supported by a frame 71 of the clutch means 64. The frame 71 is connected to the sliding sill 54 of the shock absorbing mechanism 14 so that the second shaft means 61 will move with the sliding sill and be telescopically slidable within the first shaft means 33. On an end opposite from the first shaft means 33, the second shaft means (FIGURES 9 and 10) is provided with a second lever arm 72 which supports a pin 73 which is part of the second transfer means 63. The pin 73 engages a sliding pin guide means 74 which is attached to a U-shaped coupler guide member 75. A shank 76 of the coupler 15 is slidably received in the coupling guide member 75 and receives the pivoting movement of the aligning and steering device from the second transfer means 63. The coupler guiding member 75 is slidably supported on a pair of cross members 77, 77 which are attached to the sliding sill 54. The relationship of the coupling guide member 75 and the supporting member 77 is such that the guide 75 may slide with the coupler shank 76 a minimum distance of about 3 inches as the coupler moves in the compressible draft gear 53 which pivotally connects the coupler to the sliding sill 54.

Figure 9:
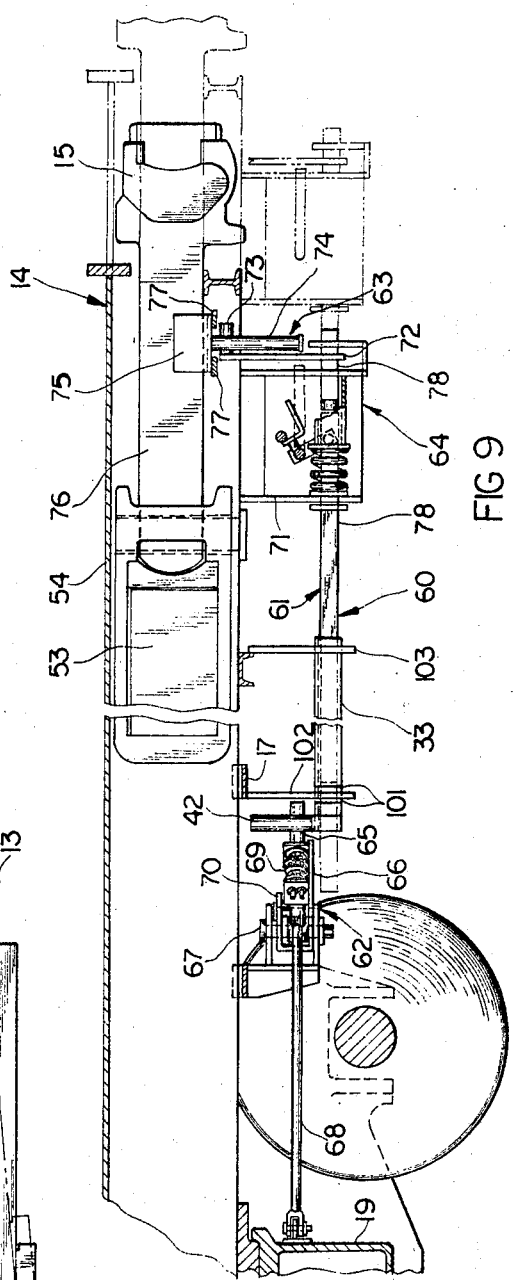
FIGURE 9 is a side view of the truck and coupling device of the railroad car illustrated in FIGURE 8 with some parts in section and some portions omitted for purposes of illustration.
Figure 10:
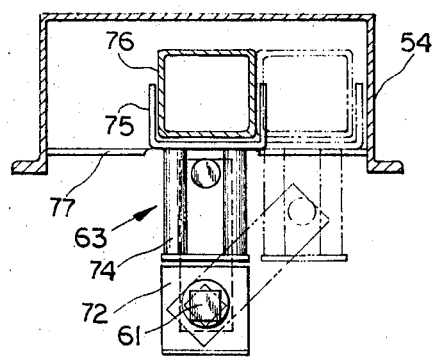
FIGURE 10 is a partial section taken on line X—X of FIGURE 8.
Figure 11:
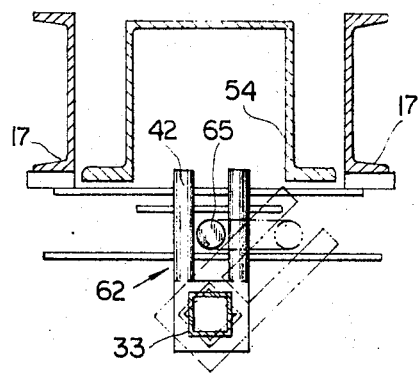
FIGURE 11 is a partial section taken on line XI—XI of FIGURE 8.
Figure 12:
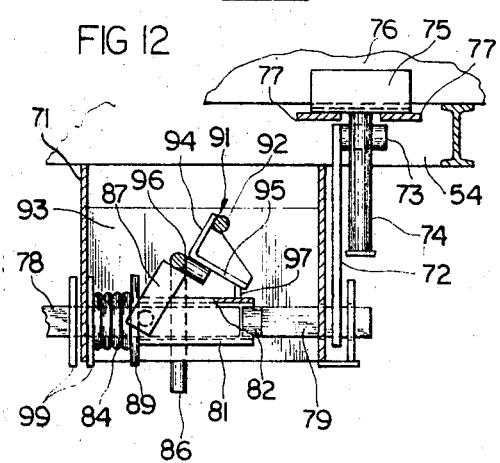
FIGURE 12 is a partial section taken on line XII—XII of FIGURE 8 showing the clutch in the disengaged position.
Figure 13:
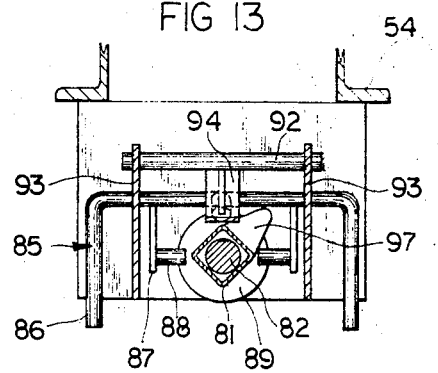
FIGURE 13 is a partial section taken on line XIII—XIII of FIGURE 8.

The second shaft means 61 comprises a first shaft portion 78 and a second shaft portion 79 which are interconnected by a sleeve 81 of the clutch 64 (FIGURE 12) the shaft portions 78 and 79 are of rectangular cross-section with the end 82 of the second shaft portion 79 having a circular cross-section so that when the sleeve 81 is moved to a second or disconnecting position illustrated in FIGURE 12, the shaft portion 79 is free to turn relative to the shaft portion 78. The clutch 64 further includes a spring 84 and an actuator means 85 for moving the sleeve 81 against the spring 84 to the second position. The spring 84 urges the sleeve 81 into an engaged or a first position as illustrated in FIGURE 9. As best illustrated in FIGURES 12 and 13, the actuating means 85 comprises a U-shaped lever arm 86 which is pivotally supported in the side wall 93 of the frame 71 and which has a pair of depending arms 87, each having a pin 88 which engages a flange or collar 89 on the sleeve 81. Clockwise movement of the lever arm 86 causes the pins 88 to engage the flange 89 and force the sleeve 81 to the second or disengaged position. The frame 71 of the clutch 64 supports a lock means 91 which will hold the sleeve 81 in the second or disengaged position. The lock means 91 comprises a pivoting bar 92 which is rotatably mounted in the side walls 93 of the frame 71. The rod 92 supports a member 94 which is a right angle bent with the longer leg 95 having sufficient length to cause the member 94 to pivot to the locking position due to the force of gravity. The actuating arm 86 is provided with a dog 96 which is engaged by the longer leg 95 as the lock pivots to the engaged position. As illustrated, the lock 91 will prevent the actuating means 85 from rotating in a counterclockwise direction to allow the sleeve to be moved to the first or engaged position. To disengage the lock mechanism 91, the sleeve 87 is provided with a cam means 97 which is a projection having opposite facing cam surfaces which will contact the leg 95 to lift it from the engaged position on the dog 96.

The clutch 64 can be actuated by rotating the lever arm 86 clockwise to the position best illustrated in FIGURE 12 to selectively disconnect the coupler 15 from effect of the steering and aligning mechanism. If the car is on a straight section of track, the sleeve 81 is in a position in which the cam means 97 extends in an upright position and prevents the leg 95 of the lock means 91 from dropping into a locking position. Thus if the operator releases the lever arm 86 of the actuating means 85, the spring 84 will urge the sleeve 81 towards the first or engaging position. If the coupling has been shifted to one side or the other, the rectangular cross section of the second portion 97 will not mesh with the rectangular sleeve until the coupling has been moved to a center position. However, once the coupler 15 has been engaged, the action of the coupling device will cause the coupling to swing past the center position aligning the rectangular cross section of the second shaft portion 79 with the sleeve 81 to allow the completion of the movement of the sleeve to the first or connecting position.

If the car is on a curved section of track, the sleeve 81 is rotated along with the first and second shaft means so that the cam means 97 is moved from beneath the leg 95 of the lock means 91. If the arm 86 of the actuating means 85 is moved to a position to disengage the sleeve 81 from the second shaft portion 79, the lock means 91 is free to fall into the illustrated locking position. While the clutch 64 is held in the disengaged or second position, the coupler 15 can be pivoted to any desired angle. After being located in the desired angle and the coupling to an adjacent car completed, the movement of the truck to or past a center line position will cause the cam means 97 on the sleeve 81 to be rotated to the upright position to lift or force the leg 95 of the lock means 91 to the disengaged position to disengage the lock means. Once the lock means 91 has been disengaged, the spring 84 will force the sleeve 81 and the actuating means 85 toward the first or engaged position. If the first and second shaft portions 78 and 79 are in alignment, the sleeve 81 completes its movement to the first position; however, if there is a non-alignment between the two shaft portions 78 and 79, the sleeve will move only to the position in which the rectangular cross section of the second shaft portion is engaged by the end of the sleeve until the two shaft portions become aligned which will occur when a pulling load is applied to the coupling 15.

As stated hereinbefore, the frame 71 of the clutch 64 rotatably supports the second shaft means 61, the first portion 78 is provided with a pair of stops 99 which limit the axial movement of first shaft portion 78 with respect to the frame 71; therefore, if the sliding sill 54 of the shock absorbing mechanism of the underframe is moved either inwardly or outwardly, with respect to the fixed frame, the second shaft means 61 is carried by the frame 71 and moves with the sliding sill.

Figure 14:
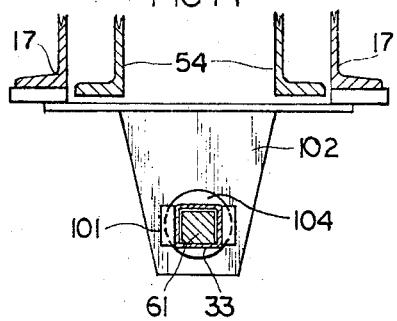
FIGURE 14 is a partial section taken on line XIV—XIV of FIGURE 8.
Figure 15:
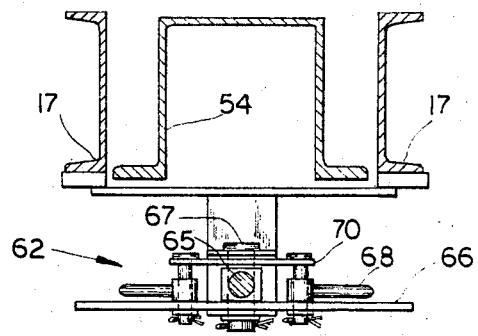
FIGURE 15 is a partial section taken on line XV—XV of FIGURE 8.

As in the previously explained embodiment, the first shaft means 33 is provided with stops 101 which prevent the axial movement of the first shaft means 33 with respect to the supporting bracket 102 as illustrated in FIGURE 14. It should be noted that the stops 101 could be placed to cooperate with either the supporting bracket 102 or the supporting bracket 103 or to cooperate in conjunction with both of the brackets to prevent the axial movement of the first shaft means 33 in the openings such as 104 of the brackets.

Although the first and second shaft means 33 and 61 have been described as having a rectangular cross-section to provide means to transmit axial rotation therebetween, the first shaft means 33 could be a round tube similar to tube 55 with an axial extending slot 57 as shown in FIGURE 7. The end of the second shaft means 61 which is slidably received in the first shaft means 33 could have the configuration of the shaft 56 with a projection 58 which is engaged in the slot 57 to provide another type of means to transmit axial rotation between the first and second shaft means.

I claim as my invention:

1. A coupling device for a railroad car having a frame mounted on trucks, said coupling device being aligned and steered by the movement of the truck of the car, said device comprises a coupler pivotally and slidably connected to the frame of the car, a first shaft means having a first lever arm at one end rotatably attached to the frame with said lever arm adjacent the truck and the axis of the shaft means parallel to the center line of the frame, a second shaft means being slidably engageable with said first shaft means and movable along the axis of said first shaft means, said first and second shaft means having means to transmit axial rotation therebetween, said second shaft means having a second lever arm adjacent said coupler, a first transfer means interconnecting the first lever arm with the truck to rotate said first shaft means on its axis in response to the turning movement of the truck, and a second transfer means interconnecting the second lever arm to the coupler for pivoting the coupler in response to rotation of the second shaft means so that turning movement of the truck is transferred through said first and second shaft means to pivot said coupler in response to movement of the truck.

2. A coupling device according to claim 1, wherein said first shaft means is a tubular shaft and wherein said second shaft means is telescopically engaged therein.

3. A coupling device according to claim 1, wherein said transfer means interconnecting the first lever with the truck includes a pin, and wherein said first lever includes a pin guide means coacting with said pin.

4. A coupling device according to claim 3, wherein said pin is pivotally attached to the frame of the car and wherein said first transfer means includes a plate pivotally attached to the frame and having means interconnecting the truck to said plate for pivoting said plate on said frame as the truck turns, said plate having spring means engageable with said pin to urge said pin to pivot with said plate.

5. A coupling device according to claim 1, wherein said second transfer means includes a pin supported on the second lever arm and includes a pin guide means coacting with said pin for transferring rotation of said second lever arm into pivotable motion for said coupler.

6. A coupling device according to claim 5, wherein said second transfer means further includes a coupler guide member slidably supported on said frame and in slidable engagement with the shank of said coupler, said coupler guide member being attached to said pin guide means to transfer the pivotal movement thereof to said shank of the coupler.

7. A coupling device according to claim 1, which further includes a clutch means for selectively disengaging the coupler from the steering and aligning effect of the truck of the car.

8. A coupling device according to claim 7, wherein said second shaft means comprises a first shaft portion engageable with said first shaft means and a second shaft portion connected to said second lever arm, said first and second shaft portions being interconnected by said clutch means.

9. A coupling device according to claim 8, wherein said clutch means includes a sleeve telescopically disposed on said first and second shaft portions and movable between a first position of engagement with both shaft portions for transferring rotational movement therebetween and a second position disengaged from said second shaft portion, a spring to bias said sleeve to the first position and actuating means to move said sleeve to the second position.

10. A coupling device according to claim 9, wherein said clutch means further includes lock means to hold said sleeve in the second position and cam means on said sleeve to disengage said lock means as said sleeve is rotated to a predetermined position.

11. A coupling device according to claim 8, wherein said coupler is pivotally attached to a sliding sill of a shock absorber means of the frame of the car, and wherein said clutch means includes a frame attached to the sliding sill and supporting said second shaft means so that said second shaft means moves axially with respect to said first shaft means as the sliding sill moves in the frame of the car.

12. A railroad car coupling device to be used on a car having shock absorbing means comprising a slidable sill carried by the underframe of said car and a coupler attached to said sill and being aligned and steered by the movement of a truck of said car, said coupling device comprising in combination, a coupler pivotally attached to said sliding sill and movable therewith, said coupler having a pin guide means attached thereto, a structural means rigidly attached to said truck and movable therewith, said structural means having a first pin, a first lever means engaging said first pin, said first lever means having a tubular shaft that is rotatably attached to said underframe, said first lever means coacting with said first pin to rotate said tubular shaft about its axis when said truck moves, a second shaft slidably engaging said tubular shaft and movable along said axis of said tubular shaft, said second shaft having a second lever means attached at one end, a second pin mounted on said second lever means and engaging said pin guide means of said coupler, a stop means attached to said second pin to prevent said pin from becoming disengaged from said pin guide means of said coupler, said stop means coacting with said pin guide means of said coupler to move said second shaft with said sliding sill, said tubular shaft and said second shaft each having means to transmit the axial rotation of said tubular shaft to said second shaft to transmit said movement of said truck to said coupler to steer said coupler.

13. A railroad car coupling device according to claim 12 in which said means to transmit the axial rotation of said tubular shaft to said second shaft comprises said tubular shaft and said second shaft each having a rectangular shape and said second shaft being telescopically disposed in said tubular shaft.

14. A railroad car coupling device according to claim 12, wherein said means to transmit the axial rotation of said tubular shaft to said second shaft comprises a slot in said tubular shaft and a projection on said second shaft which engages said slot as said second shaft is telescopically disposed in said tubular shaft.

15. A railroad car coupling device according to claim 12 in which a torsion bar is disposed between said second shaft and said second lever means and attached thereto, said torsion bar is adapted to twist during a coupling operation to compensate for misalignment and to prevent damage to said coupling device.

References Cited
UNITED STATES PATENTS

| | | | |
|---|---|---|---|
| Re. 26,143 | 1/1967 | Cope | 213—15 |
| 862,727 | 8/1907 | Forsyth | 213—15 |
| 1,025,522 | 5/1912 | Forsyth | 213—15 |
| 3,365,078 | 1/1968 | Hathorn et al. | 213—15 |
| 3,386,596 | 6/1968 | Gutridge et al. | 213—20 |

DRAYTON E. HOFFMAN, Primary Examiner

U.S. Cl. X.R.

213—72